C. H. DANA.
Churn.
No. 17,781.
Patented July 14, 1857.
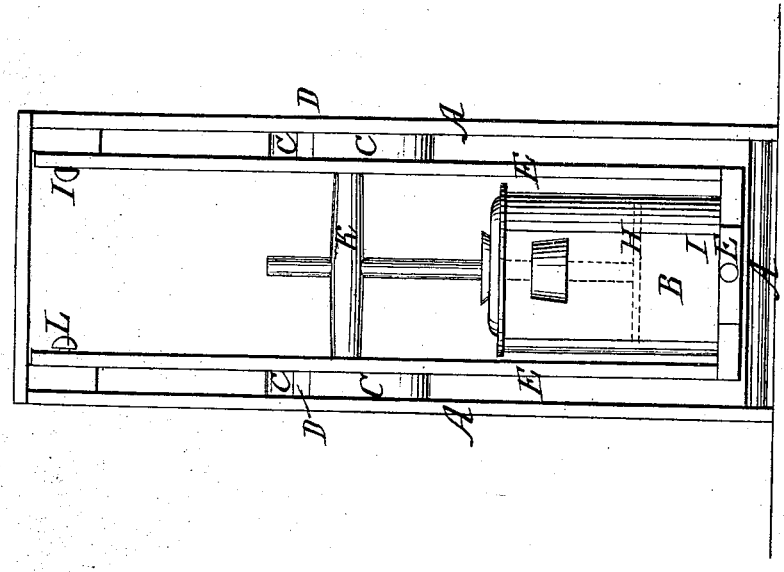
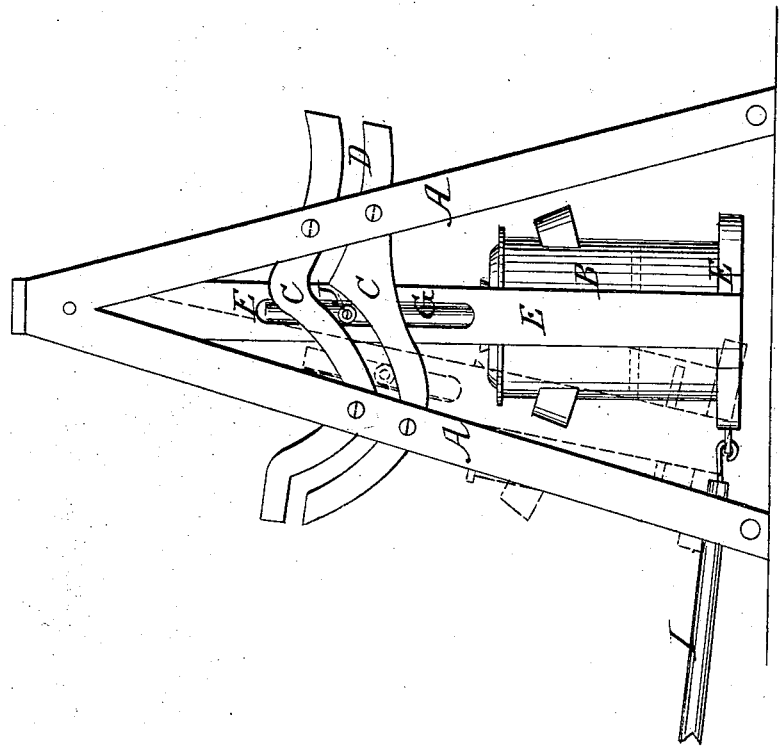

UNITED STATES PATENT OFFICE.

CHARLES H. DANA, OF WEST LEBANON, NEW HAMPSHIRE.

CHURN.

Specification of Letters Patent No. 17,781, dated July 14, 1857.

*To all whom it may concern:*

Be it known that I, CHARLES H. DANA, of West Lebanon, county of Grafton, and State New Hampshire, have invented a new and useful Improved Three-Stroke Churn; and I do hereby declare that the following is a full and exact description of the same, reference being had to the accompanying drawings and to the letters of reference marked thereon.

In the drawings, Figure 1, is a side view, showing the operation in red lines. Fig. 2, is an end view.

To enable others skilled in the art to make and use my invention, I will proceed to describe its construction and operation.

In Fig. 1, A is the frame work of the machine—B, the cream-vessel—C, pieces so curved and placed together as to form a slot D of a very peculiar shape, and possessing the peculiar property of producing three strokes of the dasher, from one of the handle—E, the swing frame which supports cream vessel B—F, a slot in E, which causes the dasher piston G to preserve its relative position to cream vessel B—H, dasher shown in red lines—I, the handle or rod by which the churn is worked—J, a friction roller working in slot D—K, end of the cross bar attached to dasher piston G. The red lines show the operation of the machine.

In Fig. 2, A is the frame—B, cream vessel—C, pieces forming slot D—E, swing frame—G, dasher piston—H, the dasher in red lines—I, handle, or working rod—K, cross bar attached to piston rod, and working in slots D and F—L, L, pivots on which swing E, works.

In the operation of my invention the cream is placed into the cream vessel by raising the lid. The lid being pressed down, motion is given to the swing frame E, by means of the handle I, and as the frame swings the cross bar with the friction rollers plays in the slots D, and F, giving three distinct motions to the dasher, thereby causing a greater amount of agitation to the milk at each swing or oscillation of the cream vessel than is performed by any other machine of the same kind. The cream is agitated first, by the swinging of the churn, then by the rapidity of the up and down motion of the dasher, which enables me in a very short time to churn, and gather the butter. The cream vessel is easily removed from the swing by the handles *b*, by lifting the same out of its place when the dasher will come out, and the cream vessel can be placed in any convenient place.

Having thus fully described the construction and operation of my invention, I do not claim as new an oscillating churn, neither do I claim the causing of the dasher to make more than one up and down stroke at each oscillation of the cream vessel independent of the specific means employed, but

What I do claim as new, and desire to secure by Letters Patent, is:

The irregular curved pieces C, forming the undulating slot D, in combination with the slotted oscillating frame E, and cross bar K, with friction rollers J, for giving three up and down strokes to the dasher, at each oscillation of the cream vessel as herein set forth.

CHARLES H. DANA.

Witnesses:
W. P. BURTON,
J. D. HOSLEY.